Patented Nov. 25, 1952

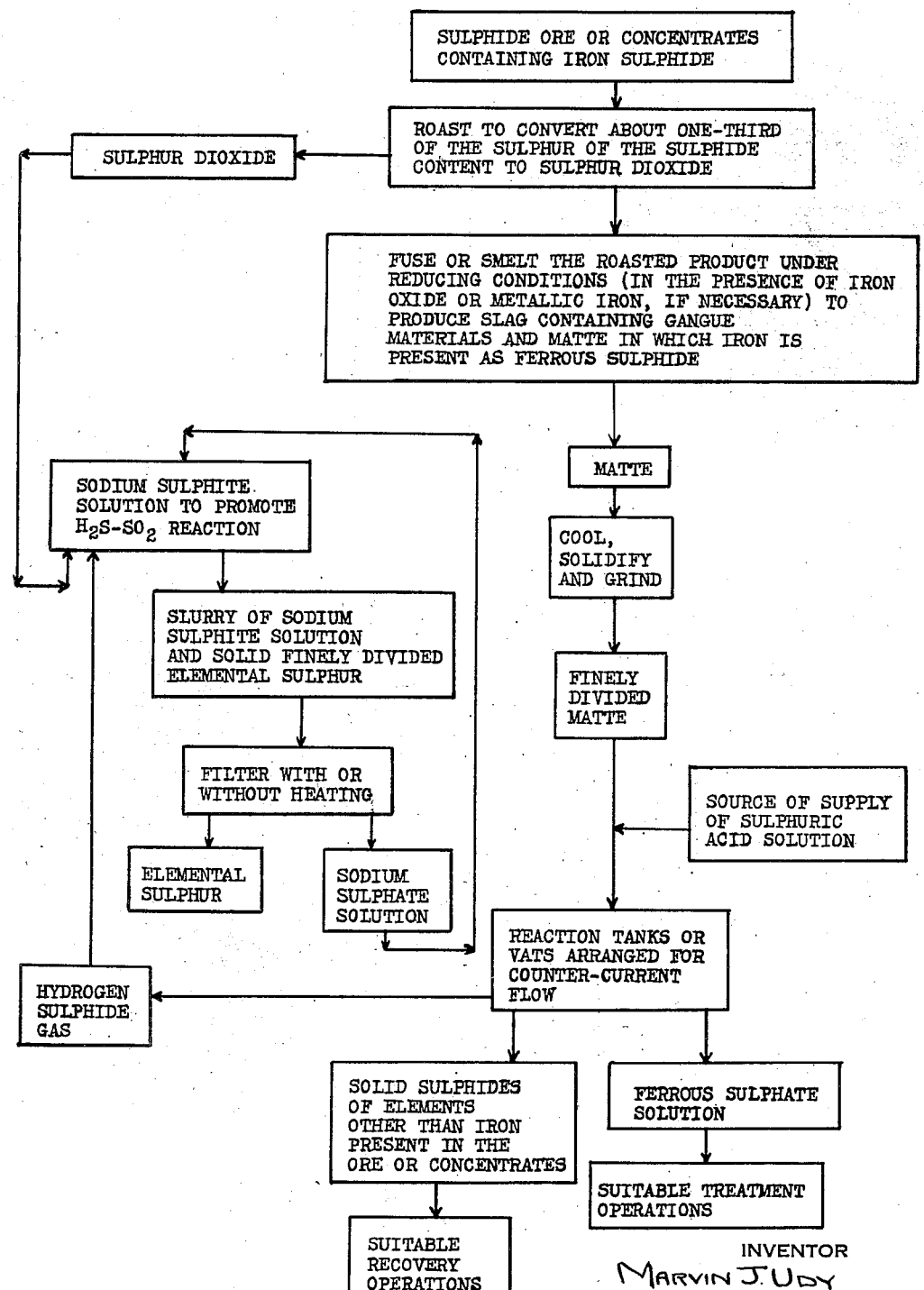

2,619,407

UNITED STATES PATENT OFFICE 2,619,407

SULFUR RECOVERY

Marvin J. Udy, Niagara Falls, N. Y., assignor to Guaranty Investment Corporation, Limited, Montreal, Quebec, Canada, a corporation of Canada Application December 9, 1946, Serial No. 715,115

14 Claims. (Cl. 23—224)

This invention relates to sulphur recovery and has for an object the provision of an improved sulphur recovery method or process. More particularly, the invention contemplates the provision of an improved method or process for recovering sulphur from iron sulphide-bearing material. The invention contemplates the provision of an improved method or process for recovering from iron sulphide-bearing material both substantially pure elemental and iron in the form of ferrous sulphate in a solution substantially free of all other elements originally present in the iron sulphate-bearing material.

Throughout the specification and claims, the term "ore" is intended to include other iron sulphide-bearing materials such as concentrates produced from crude ore as well as crude ore.

In accordance with the invention, iron sulphide-bearing material is treated under such conditions as to produce sulphur dioxide and hydrogen sulphide substantially in the proportions, two molecules of hydrogen sulphide to one molecule of sulphur dioxide, and the hydrogen sulphide and sulphur dioxide are reacted under such conditions as to produce elemental sulphur.

In a preferred process of the invention, ore containing iron sulphide and which may contain a sulphide or sulphides of one or more other metals is roasted (heated in the presence of an oxygen-containing gas such as air) in a finely divided state at a temperature and for a period of time such that there is produced (1) a gaseous product containing about one-third of the sulphur of the sulphide content of the ore, in the form of sulphur dioxide, and (2) a solid product in pulverulent form containing all of the iron and any other metal present and the balance of the sulphur of the sulphide content of the ore.

The solid product of the roasting treatment is smelted subsequently with suitable fluxing material and under other suitable conditions to produce a matte containing sulphides of iron and any other metal present in the ore, which is soluble in a mineral acid such as sulphuric acid, and a separable slag containing the gangue materials of the ore. The matte and slag products are separated and the matte, solidified and in finely divided condition, subsequently is digested with acid to effect the separation of iron from other metals contained therein and to produce a gaseous product containing about two-thirds of the sulphur of the sulphide content of the ore in the form of hydrogen sulphide.

In another preferred process of the invention, the ore is smelted directly under oxidizing conditions to produce (1) a gaseous product containing about one-third of the sulphur of the sulphide content of the ore in the form of sulphur dioxide and (2) a molten product comprising slag containing the gangue materials of the ore and matte containing the balance (about two-thirds) of the sulphur of the sulphide content of the ore. This type of operation may be conducted by melting the ore and blowing an oxidizing gas such as air through the molten product or by melting the ore and maintaining the molten product in contact with the atmosphere to accomplish the desired degree of oxidation of sulphur, as, for example, in a reverberatory type matting furnace.

The matte may be, and preferably is, treated further, either before or after separation of the slag therefrom, to insure its solubility in an acid such as sulphuric acid. The acid-soluble matte free of slag and in solid, finely divided condition, is digested with acid to effect the separation of iron from other metals contained therein and to produce (1) a gaseous product containing about two-thirds of the sulphur of the sulphide content of the ore in the form of hydrogen sulphide, (2) a solution of ferrous sulphate substantially free of all elements other than iron originally present in the ore, and (3) a solid product containing sulphides of other elements present in the ore.

The solid product of the roasting treatment and the matte product resulting from smelting the ore under oxidizing conditions preferably are smelted under such conditions as to produce matte products in which the proportion of sulphur to metal does not exceed one atom of sulphur for each atom of metal. For example, a product containing iron sulphide, in which the proportion of iron to sulphur is smaller than that indicated by the formula, FeS, nickel sulphide (NiS) and copper sulphide (CuS or $Cu_2S$), preferably is smelted under conditions such that the amount and proportion of sulphur in the resulting matte does not exceed one atom of sulphur for each atom of iron (Fe), nickel (Ni) and copper (Cu) contained therein. Treatment of a pyritic ore in accordance with the invention preferably is so conducted that the final matte product contains a large proportion or substantially all of the iron in the form of ferrous sulphide or in a lower state of oxidation, all iron pyrite being decomposed. Preferably, smelting is carried out under conditions such as to effect the reduction to metal or elimination of any iron oxide which may be formed in a preliminary oxidizing treatment.

Smelting may be carried out in any suitable type of furnace, and adjustment of the proportions of sulphur may be carried out in any suitable manner, as, for example (1) by smelting the charge in the presence of iron oxide, and a reducing agent such as coke to reduce the iron oxide to metallic iron and effect chemical combination of the metallic iron with the excess sulphur, or (2) by smelting the charge in the presence of sufficient metallic iron to combine with the excess sulphur. Smelting may be carried out under conditions such as to produce a matte product containing free or elemental iron. The production or incorporation of free iron in the final matte product insures the establishment of the proper ratio of sulphur to metal in the matte product. Any suitable amount of metallic iron may be incorporated in the final matte product. Usually, an amount of metallic iron equal to a fraction of one percent of the weight of the matte insures proper solubility of the matte product.

The matte may be subjected to the action of acid in any suitable physical condition and according to any suitable procedure. Preferably the molten matte produced by smelting sulphide ore, or iron sulphide-bearing calcine resulting from roasting the ore, is cooled and solidified, and the solidified matte is ground to form a finely divided matte product. The matte may be ground to form a product comprising particles of any suitable sizes. The time required for completion of the reaction between the acid and the matte depends to some extent upon the sizes of the matte particles, the reaction taking place more rapidly when smaller particles or matte are employed. Generally, reaction between the matte and acid proceeds rapidly to completion when a matte product consisting largely of particles small enough to pass a 100-mesh screen is employed.

Treatment of the matte with acid may be carried out according to any suitable procedure as, for example, in a batch-type operation or in a counter-current type operation, and an aqueous solution of acid of any suitable initial concentration or strength may be employed. Usually, I prefer to employ an aqueous solution of sulphuric acid containing sulphuric acid in such concentration that treatment of the matte with the acid results in consumption of all of the acid of the solution and the production of a neutral or substantially neutral solution of ferrous sulphate, but I may employ an aqueous solution of sulphuric acid containing sulphuric acid in such concentration that treatment of the matte results in consumption of only a portion of the acid of the solution and the production of an aqueous solution of ferrous sulphate containing some free acid. In the treatment of zinc-bearing matte products, acid should be employed in amounts such that the solutions of ferrous sulphate produced contain not more than about 15 grams of sulphuric acid per liter of water contained in the solutions.

In treating matte with an aqueous solution of sulphuric acid, I prefer to employ a solution of such concentration and to so conduct the acid treatment that a substantially neutral (or acid-free) concentrated solution of ferrous sulphate is produced. Treatment of the matte with acid preferably is carried out at an elevated temperature above about 25° C., and the acid solution employed preferably is of such concentration that the resulting ferrous sulphate solution will be saturated when cooled to 25° C. An aqueous solution of sulphuric acid containing sulphuric acid ($H_2SO_4$) in amount equal to about fifteen to twenty percent of the weight of the solution may be employed advantageously in the treatment of matte containing iron and nickel or cobalt or both at temperatures above 25° C. and below the boiling temperature of the liquid. In the treatment of matte containing iron and nickel or cobalt or both, it is advisable to employ temperatures below the boiling temperatures of the liquids in order to maintain the liquids saturated with respect to hydrogen sulphide. In treating zinc-bearing mattes, also, it is advisable to employ temperatures below the boiling temperatures of the liquids. Boiling results in driving off the hydrogen sulphide rapidly, and, consequently, zinc, nickel and cobalt may be converted to soluble compounds. In the treatment of zinc-free and nickel and cobalt-free matte products such, for example, as matte products containing sulphides of iron and copper, boiling temperatures may be employed. The maximum strength or concentration of the acid solution employed will be determined to some extent by the permissible temperature of treatment, since the concentration of the ferrous sulphate solution produced depends upon the strength or concentration of the acid solution employed and the temperature of treatment.

In the treatment of matte products containing iron and cobalt or nickel or both and in the treatment of zinc-bearing matte products, I prefer to conduct the acid treatments at temperatures between about 50° C. and the boiling temperatures of the liquids and to employ acid solutions of such concentrations as to produce concentrated ferrous sulphate solutions from which ferrous sulphate can be crystallized upon cooling to temperatures between the temperature of treatment and about 25° C. I may, however, employ relatively weak acid solutions and produce neutral or substantially neutral solutions of ferrous sulphate from which ferrous sulphate will not crystallize upon cooling to a temperature of 25° C. or lower.

I prefer to treat nickel-bearing matte with acid in a counter-current system, employing a series of tanks or vats, introducing untreated matte into the first tank or vat of the series while introducing the initial aqueous solution of sulphuric acid into the last vat or tank of the series, effecting partial decomposition of the matte and partial consumption of the acid in each tank, passing residual solid material to each of the various vats or tanks in series from the first to the last and passing the acid solution to each of the vats or tanks in series from the last to the first, withdrawing from the first vat or tank a substantially neutral concentrated solution of ferrous sulphate and withdrawing from the last tank or vat a substantially iron-free nickel sulphide-bearing product. I prefer to heat the liquid in the last tank or vat to a temperature of about 70° C. or higher. Heat developed as the result of the reaction maintains the temperature of the liquid in the first tank at about 50° C.

The solid nickel-bearing product obtained from the last tank or vat in the series will contain other metals such as copper, cobalt, silver, gold and platinum which may be present in the matte subjected to the acid treatment originally. Separation and recovery of the various metals which may be present in the nickel sulphide-bearing product may be carried out in any suitable manner.

I may also treat zinc-bearing matte in a counter-current system in the manner and under conditions similar to those described above for the treatment of nickel-bearing matte. In treating zinc-bearing matte in such manner, I may recover all or part of the zinc as zinc sulphide in the last tank or vat. When a portion only of the zinc is recovered as zinc sulphide in the last tank or vat, I may recover the remainder of the zinc as zinc sulphate by filtering and thereafter cooling the solution from an intermediate tank or vat to crystallize zinc sulphate contained therein, the supernatant liquor being re-introduced into the system in the next preceding tank or vat. Other metals present in the matte product such, for example, as copper, silver, gold and platinum will be recovered in the last tank or vat.

The ferrous sulphate solution produced in the process may be utilized in any suitable manner. It can be treated for the recovery of the ferrous sulphate in solid form, for example, and the solid ferrous sulphate may be marketed as such or decomposed to effect recovery of the iron in the form of iron oxide and recovery of the sulphur therein in oxide form.

The oxidizing and digestion treatments preferably are carried out in apparatus designed to permit the collection of the sulphur dioxide-containing and the hydrogen sulphide-containing gases. The sulphur dioxide and hydrogen sulphide, containing about one-third and two-thirds, respectively, of the sulphur combined with iron in the original ore are brought into reacting relationship to produce elemental sulphur as a result of a reaction proceeding in accordance with the following equation in which one-third of the elemental sulphur produced is furnished by the sulphur dioxide and two-thirds is furnished by the hydrogen sulphide:

$$2H_2S + SO_2 = 2H_2O + 3S$$

(Normally, the amount of sulphur combined with metals other than iron in the ore is so small compared with the amount combined with iron that, for purposes of convenience, I have referred herein and in the claims to the production of sulphur dioxide and hydrogen sulphide products containing one-third and two-thirds, respectively, of the sulphur of the sulphide content of the ore. This reference and other similar references are intended to cover and include the production of sulphur dioxide and hydrogen sulphide substantially in the proportions required for producing sulphur in accordance with the $H_2S$—$SO_2$ reaction illustrated by the above equation. Some of the sulphur originally combined with elements such as copper, nickel, cobalt and zinc may, of course, be oxidized or reduced or otherwise modified to form sulphur dioxide and hydrogen sulphide.)

According to a complete preferred process of the invention, I utilize my discovery (described and claimed in my application Serial No. 518,417, filed January 15, 1944) that a reaction between the gases, hydrogen sulphide and sulphur dioxide, in accordance with the equation $$2H_2S + SO_2 = 2H_2O + 3S$$

is promoted when the gases are passed in contact with an aqueous solution of a compound capable of reacting with sulphur dioxide or hydrogen sulphide or both to form unstable compounds from which the absorbed or combined sulphur dioxide and hydrogen sulphide may be liberated as such.

In practicing the invention, I prefer to employ a compound which, in aqueous solution, is capable of reacting with sulphur dioxide introduced into the solution to form a bisulphite. I prefer to employ the more readily available and relatively inexpensive compounds such, for example, as alkali metal compounds of the type of sodium carbonate, sodium sulphite, sodium hydroxide and sodium sulphate.

According to the preferred method of the invention, the sulphur dioxide and hydrogen sulphide gases to be reacted are passed into or bubbled through a column of solution in a suitable container. When a sulphite compound or a sulphate compound is employed initially, both gases may be passed into the solution simultaneously in reacting proportions. When a compound such as sodium carbonate or sodium hydroxide is employed initially, sulphur dioxide gas alone preferably is passed into the solution until the carbonate or hydroxide is converted to sulphite, and, thereafter, both gases may be passed into the solution simultaneously. Elemental sulphur may be separated from the solution from time to time.

In a modified process of the invention, sulphite in aqueous solution may be converted to bisulphite by passing sulphur dioxide alone into the solution, and the sulphite may be re-formed by passing hydrogen sulphide alone into the bisulphite solution. The solution may be treated alternately with sulphur dioxide and hydrogen sulphide any suitable number of times, and elemental sulphur produced may be separated from the liquid from time to time when sufficient quantities have been accumulated.

Solutions of any suitable concentrations may be employed. I have employed successfully solutions containing alkali metal compounds in amounts equal to about one percent (1%) to twenty (20%) of the weights of the solutions. I prefer to employ solutions containing alkali metal compounds in amounts equal to about five percent (5%) to ten percent (10%) of the weights of the solutions.

The sulphur recovery portion of the method or process of the invention may be employed advantageously in the treatment of either dilute or concentrated gases for the production of elemental sulphur. Thus, for example, the gases containing hydrogen sulphide and the gases containing sulphur dioxide, which may contain other gases such as nitrogen and oxygen, may be subjected to preliminary concentration treatments to produce substantially pure hydrogen sulphide and substantially pure sulphur dioxide or they may be employed directly without concentration. Either gas may be employed in a concentrated or substantially pure state and the other in a dilute condition.

Treatment of a solution with the gaseous reagents may be carried out at any suitable temperature below the decomposition temperature of bisulphite capable of being formed by reaction of the sulphur dioxide with the dissolved compound. Treatment of a solution with the gaseous reagents may be carried out advantageously at the temperature which will be attained in normal operations when the solution is employed initially at room temperature and when no special provisions are made for the application of heat from extraneous sources or for the dissipation of heat resulting from reactions taking place. If desired, provisions can be made to provide heat from extraneous sources and thus maintain the solution at a relatively high temperature or provisions can be made to dissipate heat resulting from reactions taking place and thus maintain the solution at a relatively low temperature.

Treatment of an aqueous solution of sulphite such as sodium sulphite with hydrogen sulphide and sulphur dioxide in reacting proportions results in the production of a granular, readily filterable elemental sulphur product. When the elemental sulphur produced contains substantial amounts of finely divided particles, filtering efficiency can be improved by subjecting the solution to a brief heat treatment at temperatures up to the boiling point prior to filtering. The elemental sulphur may be separated from the liquid in which it is produced by sedimentation and decantation or by filtering. The elemental sulphur may be washed and dried and marketed in any suitable form. It may, for example, be marketed in the finely divided form in which it is separated from the liquid, it may be pressed into cakes or blocks or other suitable forms, or it may be melted and cast into suitable forms.

I claim:

1. The method of recovering sulphur from iron sulphide-bearing material which comprises subjecting the iron sulphide-bearing material to an oxidizing treatment and forming (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, and reacting the sulphur dioxide and the hydrogen sulphide to produce elemental sulphur.

2. The method of recovering sulphur from iron sulphide-bearing material which comprises subjecting the iron sulphide-bearing material to an oxidizing treatment and forming (1) a gaseous product containing sulphur dioxide in amount equivalent to about one-third of the sulphur contained in the iron sulphide-bearing material and (2) a solid product containing about two-thirds of the sulphur of the iron sulphide-bearing material, melting the solid product and producing a matte product, treating the matte product in solid, finely divided form with acid and producing hydrogen sulphide, and reacting the sulphur dioxide and the hydrogen sulphide to produce elemental sulphur.

3. The method of recovering sulphur from iron sulphide-bearing material which comprises subjecting the iron sulphide-bearing material to an oxidizing treatment and forming (1) a gaseous product containing sulphur dioxide in amount equivalent to about one-third of the sulphur contained in the iron sulphide-bearing material and (2) a solid product containing about two-thirds of the sulphur of the iron sulphide-bearing material, melting a charge comprising metallic iron and the solid product and producing a matte product, treating the matte product in solid, finely divided form with acid and producing hydrogen sulphide, and reacting the sulphur dioxide and the hydrogen sulphide to produce elemental sulphur.

4. The method of recovering sulphur from iron sulphide-bearing material which comprises subjecting the iron sulphide-bearing material to an oxidizing treatment and forming (1) a gaseous product containing sulphur dioxide in amount equivalent to about one-third of the sulphur contained in the iron sulphide-bearing material and (2) a solid product containing about two-thirds of the sulphur of the iron sulphide-bearing material, melting a charge comprising iron oxide, carbonaceous material and the solid product and producing a matte product, treating the matte product in solid, finely divided form with acid and producing hydrogen sulphide, and reacting the sulphur dioxide and the hydrogen sulphide to produce elemental sulphur.

5. The method of recovering sulphur from iron sulphide-bearing material which comprises melting the iron sulphide-bearing material under oxidizing conditions and producing (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, and reacting the sulphur dioxide and the hydrogen sulphide to produce elemental sulphur.

6. The method of recovering sulphur from iron sulphide-bearing material which comprises melting a charge comprising the iron sulphide-bearing material and metallic iron under oxidizing conditions and producing (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, and reacting the sulphur dioxide and the hydrogen sulphide to produce elemental sulphur.

7. The method of recovering sulphur from iron sulphide-bearing material which comprises melting a charge comprising the iron sulphide-bearing material, iron oxide and carbonaceous material under oxidizing conditions and producing (1) sulphur dioxide in amount equivalent to about one-third of the sulphur contained in the iron sulphide-bearing material and (2) a matte product containing about two-thirds of the sulphur of the iron sulphide-bearing material, treating the matte product in solid finely divided form with acid and producing hydrogen sulphide, and reacting the sulphur dioxide and the hydrogen sulphide to produce elemental sulphur.

8. The method of recovering sulphur from iron sulphide-bearing material containing one or more sulphides of other metals of the group consisting of copper and nickel which comprises subjecting the iron sulphide-bearing material to an oxidizing treatment and forming (1) a gaseous product containing sulphur dioxide and (2) a matte product containing one or more sulphides of the other metals and containing as iron sulphide about two-thirds of the sulphur of the iron sulphide-bearing material, treating the matte product in solid, finely divided form with acid to dissolve the iron sulphide and produce gaseous hydrogen sulphide and a solid product containing one or more sulphides of the other metals, and reacting the hydrogen sulphide and sulphur dioxide to produce elemental sulphur, production of sulphur dioxide and hydrogen sulphide being controlled to produce about two molecules of hydrogen sulphide for each molecule of sulphur dioxide.

9. The method of recovering sulphur from iron sulphide-bearing material which comprises subjecting the iron sulphide-bearing material to an oxidizing treatment and forming (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, and contacting the hydrogen sulphide and the sulphur dioxide with an aqueous solution containing an alkali metal sulphite to produce elemental sulphur.

10. The method of recovering sulphur from iron sulphide-bearing material which comprises subjecting the iron sulphide-bearing material to an oxidizing treatment and forming (1) a gaseous product containing sulphur dioxide in amount equivalent to about one-third of the sulphur contained in the iron sulphide-bearing material and (2) a solid product containing about two-thirds of the sulphur of the iron sulphide-bearing material, melting the solid product and producing a matte product, treating the matte product in solid, finely divided form with acid and producing hydrogen sulphide, and contacting the hydrogen sulphide and the sulphur dioxide with an aqueous solution containing an alkali metal sulphite to produce elemental sulphur.

11. The method of recovering sulphur from iron sulphide-bearing material which comprises melting the iron sulphide-bearing material under oxidizing conditions and producing (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, and contacting the hydrogen sulphide and the sulphur dioxide with an aqueous solution containing an alkali metal sulphite to produce elemental sulphur.

12. The method of recovering sulphur from iron sulphide-bearing material which comprises subjecting the iron sulphide-bearing material to an oxidizing treatment and forming (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, absorbing the sulphur dioxide in an aqueous solution of sodium sulphite and contacting the solution with the hydrogen sulphide to produce elemental sulphur.

13. The method of recovering sulphur from iron sulphide-bearing material which comprises subjecting the iron sulphide-bearing material to an oxidizing treatment and forming (1) a gaseous product containing sulphur dioxide in amount equivalent to about one-third of the sulphur contained in the iron sulphide-bearing material and (2) a solid product containing about two-thirds of the sulphur of the iron sulphide-bearing material, melting the solid product and producing a matte product, treating the matte product in solid, finely divided form with acid and producing hydrogen sulphide, absorbing the sulphur dioxide in an aqueous solution of sodium sulphite and contacting the solution with the hydrogen sulphide to produce elemental sulphur.

14. The method of recovering sulphur from iron sulphide-bearing material which comprises melting the iron sulphide-bearing material under oxidizing conditions and producing (1) sulphur dioxide in amount equivalent to about one-third of the sulphur contained in the iron sulphide-bearing material and (2) a matte product containing about two-thirds of the sulphur of the iron sulphide-bearing material, treating the matte product in solid, finely divided form with acid and producing hydrogen sulphide, absorbing the sulphur dioxide in an aqueous solution of sodium sulphite and contacting the solution with the hydrogen sulphide to produce elemental sulphur.

MARVIN J. UDY.

REFERENCES CITED

The following references are of record in the file of this patent:

UNITED STATES PATENTS

| Number | Name | Date |
| --- | --- | --- |
| 1,892,999 | Ralston | Jan. 3, 1933 |

FOREIGN PATENTS

| Number | Country | Date |
| --- | --- | --- |
| 5,230 | Great Britain | of 1882 |